United States Patent [19]
Strubbe

[11] Patent Number: 5,736,652
[45] Date of Patent: Apr. 7, 1998

[54] MASS FLOW METERING DEVICE

[75] Inventor: Gilbert Julien Irénée Strubbe, Loppem, Belgium

[73] Assignee: New Holland North America, Inc., New Holland, Pa.

[21] Appl. No.: 678,913

[22] Filed: Jul. 12, 1996

[30] Foreign Application Priority Data

Jul. 14, 1995 [GB] United Kingdom ............... 9514444

[51] Int. Cl.[6] ........................................ G01F 1/30
[52] U.S. Cl. ........................ 73/861.73; 73/861.74
[58] Field of Search ..................... 73/861.73, 861.74, 73/861.71

[56] References Cited

U.S. PATENT DOCUMENTS

| 4,765,190 | 8/1988 | Strubbe | 73/861.72 |
| 5,561,250 | 10/1996 | Myers | 73/861.73 |

FOREIGN PATENT DOCUMENTS

| 0042245 | 12/1981 | European Pat. Off. |
| 0208025A | 1/1987 | European Pat. Off. |
| 2947414A1 | 5/1981 | Germany |
| 30451728A1 | 7/1982 | Germany |

*Primary Examiner*—Richard Chilcot
*Assistant Examiner*—Jewel Artis
*Attorney, Agent, or Firm*—Larry W. Miller; John W. Stader; Frank A. Seemar

[57] ABSTRACT

A device (21) for metering the mass flow of bulk material, such as grain or other crop material, comprises a sensor member (51) with a curved surface (53) installed adjacent the outlet of a conveyor (12). The sensor member (51) is mounted for pivotment about a transverse axis (P) and is subject to the moment (M) resulting from the material flow along its surface (53). A spring means (66) is provided to keep the sensor member (51) in zero load position. The displacement of the sensor member (51) is proportional to the mass flow rate. Changing friction coefficients μ between the bulk material and the surface (53) will affect the flow pattern therealong, but an array (70) of pivot points can be found about which the measured moments (M) remain substantially insensitive to these flow changes. Alternatively a force component may be sensed of the material flow on the sensor surface (53) in a particular direction. A direction can be found wherein the force component is equally insensitive to flow changes caused by friction coefficient changes. Such metering devices may be used in grain and forage harvesters, wherein they need less recalibration under varying harvesting conditions.

21 Claims, 9 Drawing Sheets

MASS FLOW METERING DEVICE

FIELD OF THE INVENTION

This invention relates to a device for metering the mass flow of bulk material, such as the flow of clean grain to the grain tank in a combine harvester. More particularly it relates to flow meters measuring forces of this flow on a sensor surface.

BACKGROUND OF THE INVENTION

The flow rate established by such flow metering device may be displayed continuously to an operator and may be used for establishing the total material flow over a time period. In a combine harvester, the operator may want to determine the amount of clean grain being gathered in relation to the time being spent or the area being covered. Distinct mass flow measurement in combination with a measurement of the combine speed, the header width and the combine position can be used to establish the yield rate of the crop across the field being harvested. In this case the mass flow meter has to be able to provide reliable yield data, not only over the total field, but also over relatively small field lots. The results may be combined to a yield map which the farmer can use for further crop treatment, such as targeted fertilizing and spraying of bad field portions.

The reading from the prior art devices is known to be influenced by a variety of crop and harvest conditions, such that frequent recalibration of the flow meter is required in order to obtain reliable yield rate results under various circumstances. It is the object of this invention to provide a metering device which is less influenced by these changes, such that less recalibrations are necessary for a good reading accuracy. This is particularly important as the circumstances which have influenced the yield of a field lot may equally influence the meter readings during the harvest operations, such that the combined effect on the reading may be augmented or weakened.

For example, volumetric measurement devices as disclosed in European Patent EP-A-0.042.245 and German Patent DE-A-3.045.728, meter the volume rate only. For the conversion to a mass rate the volume reading is multiplied by the specific mass value of the harvested crop. Under adverse crop conditions the yield rate will decrease, but the grain kernels will also tend to be smaller, such that the specific mass is affected and the measurement device needs readjustment.

Other mass flow meters, as shown in German Patent DE-A-2.947.414 and European Patent EP-A-0.208.025, comprise a straight or curved surface which is engaged by the mass flow. The resulting force in a predetermined direction is captured by a sensor which generates a signal which is substantially proportional to the mass flow. In these systems the sensors are disposed along the bisector of the active portion of the surface.

These surfaces are subjected to the combination of centrifugal, gravity and friction forces of the layer of material flowing therealong. A decrease or increase of the friction coefficient $\mu$ between the bulk material and the metering surface will inevitably influence the material speed and the layer thickness along the surface and will consequently alter the centrifugal, gravity and friction forces. It has been experienced that the resulting total force in the direction of the bisector varies accordingly, possibly to the extent that a recalibration of the flow meter is required.

Such variations of the friction coefficient $\mu$ may occur in a harvesting machine when the another crop variety is harvested, or when harvesting takes place under varying external conditions such as ambient temperature and humidity, field relief and orientation, neighboring woodland, etc. A change in the settings of the harvester may result in the occurrence of more or less chaff in the clean grain sample, which will equally influence its friction characteristics and hence the reading of the mass metering device.

SUMMARY OF THE INVENTION

As stated above, it is the object of the present invention to provide a mass flow metering device, which may be used in harvesting machines and provides an output which is less influenced by variations in external and internal harvesting conditions, such that a recalibration may be eliminated or postponed. This flow metering device also must not hamper the normal flow of the crop material through the machine and must be free of quick contamination.

According to the invention, a mass flow metering device for metering the mass rate of a flow of bulk material is provided, the metering device comprising: feeder means for providing a flow of bulk material and inducing an outlet speed thereto in a predetermined direction at an outlet of the feeder means; a sensor member, comprising a flow deflecting surface with an inlet portion disposed in flow receiving relationship behind the outlet of the feeder means and oriented in an inlet direction substantially parallel to the predetermined direction of material flow at the outlet of the feeder means, a concave middle portion along which the material flow is guided in a generally arcuate path, and an outlet portion for discharging the material flow in an outlet direction different from the inlet direction; the arrangement being such that the flow deflecting surface is subject to a force and a moment resulting from the combination of the centrifugal, gravity and friction forces from the material flow; the metering device further comprising: means for sensing a component of the resulting force on the surface in a predetermined direction or a resulting moment of the force about a predetermined point and generating a signal proportional to the force or moment; and signal processing means coupled to the sensing means for generating an indication of the mass rate of the material flow. More particularly, the invention contemplates a mass flow metering device characterized in that the sensing means sense a force component or a moment which remains substantially constant when the mass rate is kept constant and the material flow at the outlet of the feeder means and/or along the crop deflecting surface varies as a result of variations in the range from 0 to 1 in the friction coefficient $\mu$ between the bulk material and the surface of the feeder means and the crop deflecting surface.

The sensor member may be mounted for pivotment about a pivot axis, in which case its center of gravity preferably is disposed on the pivot axis, in order to attenuate the effect of longitudinal and vertical oscillations of the machine. The location of the center of gravity may be modified by the use of counterweights.

An advantageous location for the pivot axis is situated near the tangent to the outlet portion of the deflecting surface. In a particular case optimal friction compensation could be obtained by providing the pivot axis on a line which crosses the outlet surface at about ⅘ of the surface radius and which has an angle of substantially 8° to the tangent.

The component of the resulting force in a direction generally perpendicular to the outlet direction is equally not very sensitive to changes in the friction coefficient $\mu$. Advantageously one may measure the force component in a direction falling in the range of 75° to 90° to the outlet direction.

The feeder means may comprise stationary guide means or impeller means in order to redirect the flow from a conveyor to the inlet of the sensor member. This conveyor may be a paddle conveyor equipped with paddles having curved surfaces for better concentration of the material flow near the outlet of the feeder means.

The sensing means may comprise displacement or force sensors. In the case of a pivotable sensor member, the sensing means may equally comprise a torque sensor.

The foregoing and other objects, features and advantages of the invention will appear more fully hereinafter from a consideration of the detailed description which follows, in conjunction with the accompanying sheets of drawings wherein one principal embodiment and alternative embodiments of the present invention are illustrated by way of example. It is to be expressly understood, however, that the drawings are for illustrative purposes and are not to be construed as defining the limits of the invention.

DESCRIPTION OF THE INVENTION

Figure 1:
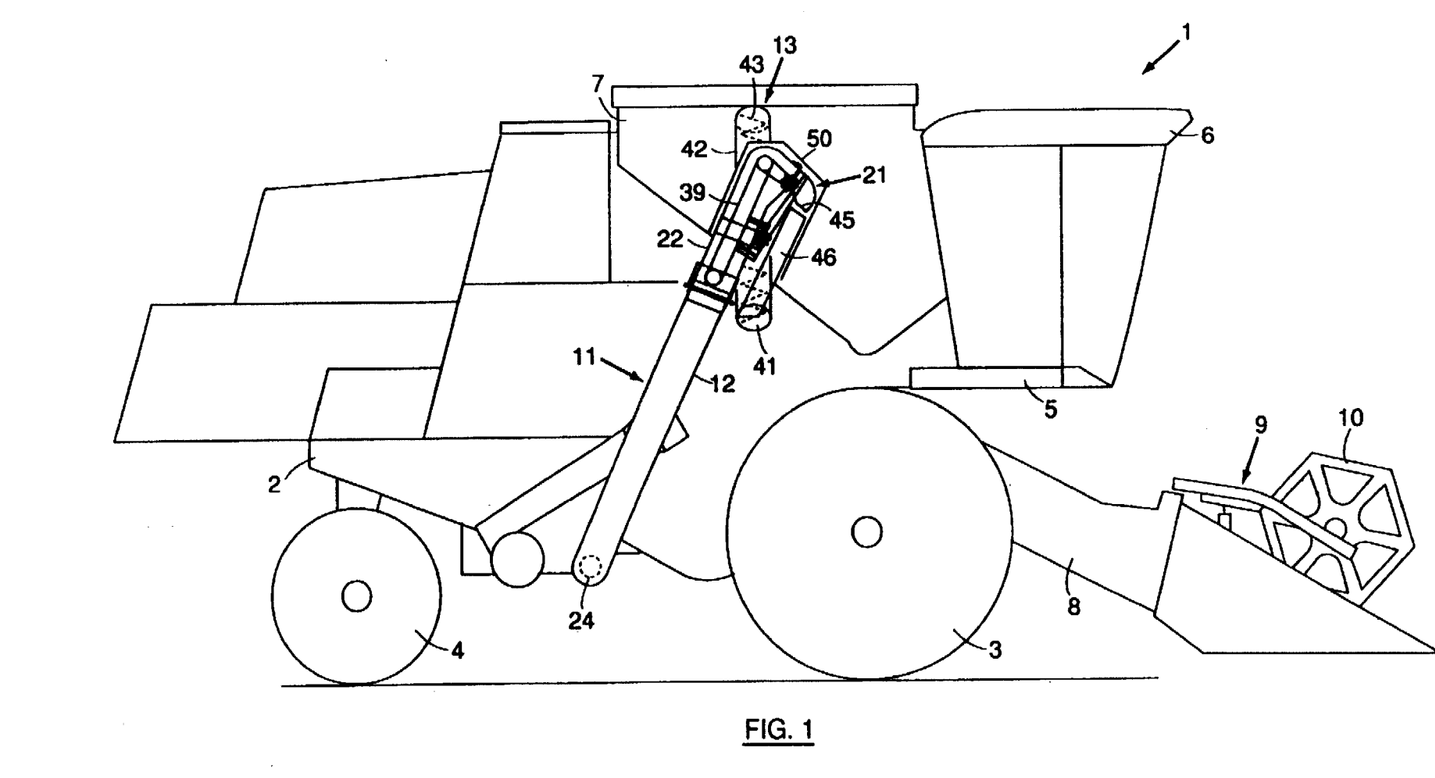
FIG. 1 is a side elevational view of a combine harvester embodying a mass flow rate metering device according to the invention in combination with a clean grain elevator.

A typical combine harvester 1 as is shown in FIG. 1, comprises a main chassis or frame 2 supported on a front pair of traction wheels 3 and a rear pair of steerable wheels 4. Supported on the main chassis 2 are an operator's platform 5 with a cab 6, a graintank 7, a threshing and separating mechanism (not shown), a grain cleaning mechanism (not shown) and an engine (also not shown). The engine provides the motive power for the various driven components of the machine as well as for the traction wheels 3. A conventional header 9 and straw elevator 8 extend forwardly of the main chassis 2. The header 9 and straw elevator 8 are pivotally secured to the chassis 2 for generally vertical movement which is controlled by extensible hydraulic cylinders. As the combine harvester 1 is propelled forwardly over a field with standing crop, the latter is severed from the stubble by a sickle bar on the header 9, whereafter a reel 10 and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the graintank 7 by a clean grain conveyor 11 comprising a lower paddle type elevator 12 and an upper, so-called "bubble-up" auger 13. The tailings either may be returned via a tailings conveyor to the threshing mechanism for reprocessing or otherwise, may be reprocessed in a separate tailings rethresher and returned to the cleaning mechanism for a repeat cleaning action. The clean grain conveyor 11 is fitted with a mass flow metering device, indicated generally at 21 in FIG. 1 and shown in greater details in FIGS. 2 and 3. The grain metering device 21 is provided generally at the outlet opening 28 of the paddle-type elevator 12.

A similar metering device may be provided on the tailings conveyor to measure the tailings flow rate. However, as both metering devices principally are identical, only the clean grain metering device will be described hereafter with reference to FIGS. 2 and 3.

Figures 2, 3:
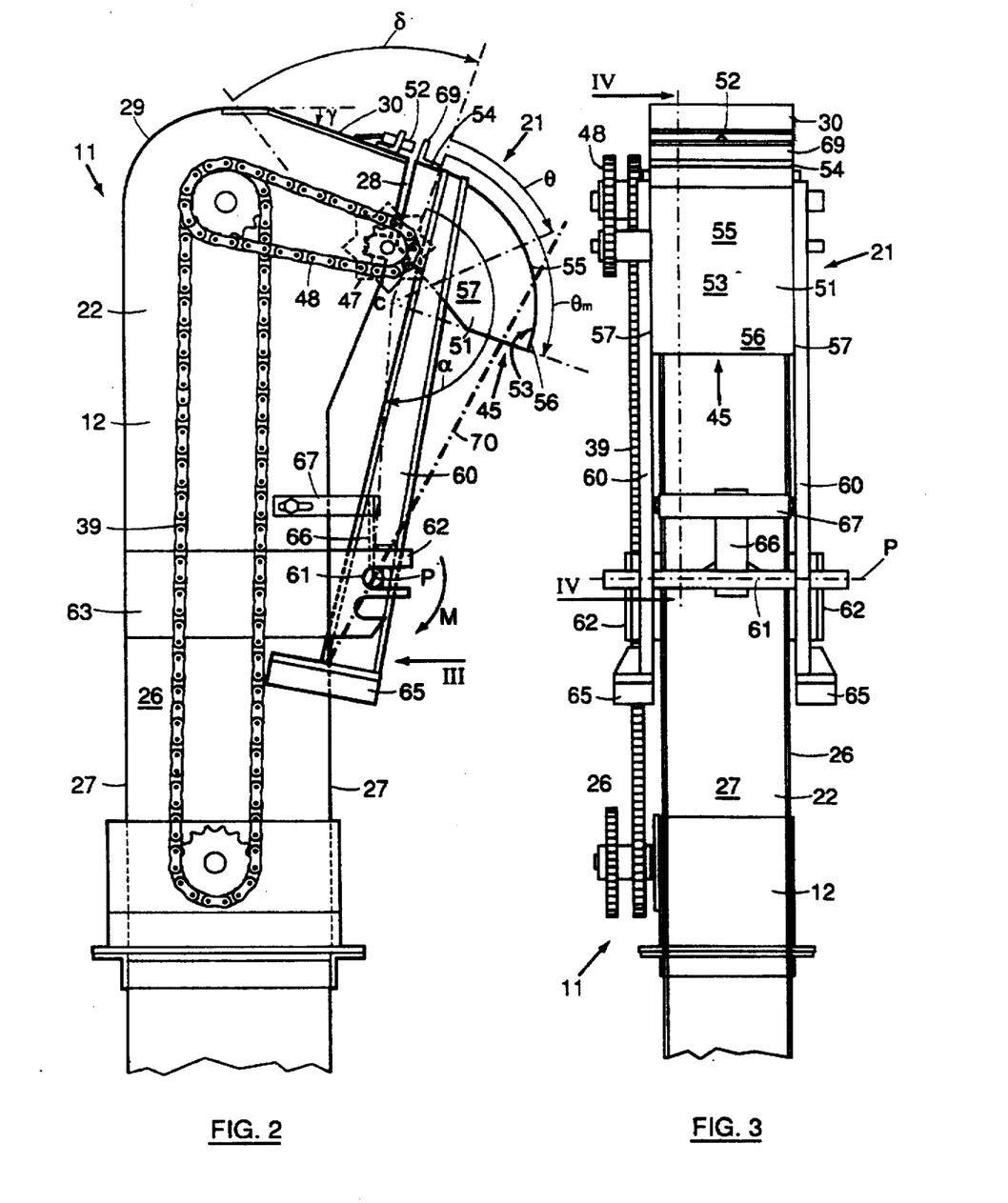
FIG. 2 is a side view on a larger scale of the metering device and its flow deflecting surface of FIG. 1.
FIG. 3 is a view of the metering device, taken in the direction of arrow III in FIG. 2.
Figure 4:
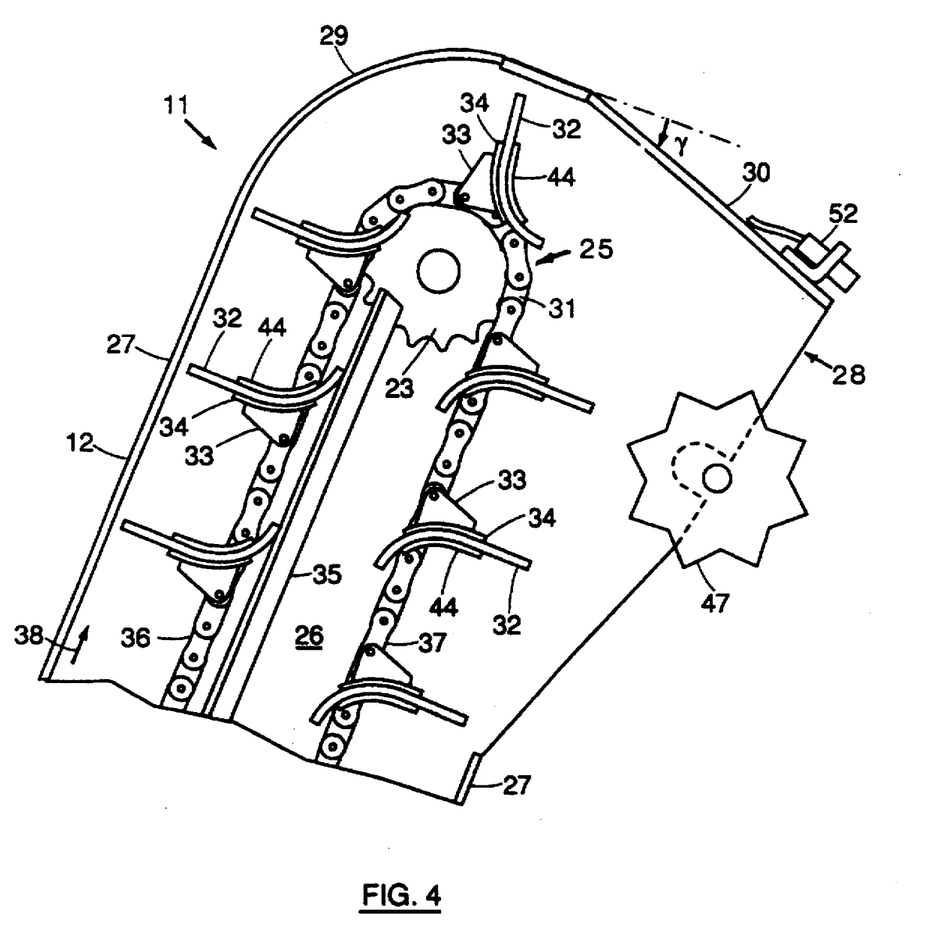
FIG. 4 is a partial sectional view of the metering device taken along lines IV—IV in FIG. 3.

The clean grain conveyor 11 is otherwise conventional in many respects. As shown in FIGS. 2, 3 and 4 the paddle-type elevator 12 comprises an elongated housing 22 of generally rectangular cross section. Upper and lower sprockets, respectively 23 and 24, are mounted in the housing 22 in alignment with respect to each other for an endless paddle conveyor 25 to extend therearound. The housing 22 has a pair of opposed side walls 26 which extend parallel to the plane defined by the paddle conveyor 25. One of said side walls 26 has a circular inlet opening generally coaxially with the lower sprocket 24. A transverse wall 27 interconnects both side walls 26 and arcuately extends around the lower sprocket 24 and the upper sprocket 23. A generally rectangular outlet opening 28 is provided in the transverse wall 27 at the upper end of the elevator housing 22 and downstream of an upper curved section 29 and an upper straight section 30 of said transverse wall 27. The straight section 30 is disposed at an angle γ in the range of 20° to the tangent of the curved section 29.

As shown in FIG. 4, the paddle conveyor 25 comprises an endless chain 31 on which the paddles 32 are mounted at regular intervals on pairs of angled brackets 33 carried by the appropriate chain links with each pair attached to a metal support plate 34 which is curved forwardly in the direction 38 of the conveyor transport. A paddle 32 is immovably riveted between the curved support plate 34 and a similarly curved press plate 44. The paddle 32 is composed of a flexible material, which is nevertheless sufficiently rigid for the intended load carrying function. Each paddle 32 is spaced from the two opposed side walls 26 and from the transverse interconnecting wall 27. However, each paddle 32 is in sliding contact with an intermediate wall 35 which divides the operative and return runs 36, 37 of the elevator 12. The paddle conveyor 25 is driven in the direction 38 via a chain-and-sprocket transmission 39 communicating motive power to the upper sprocket 23 and whereby, in operation, the paddles 32 convey grain through the operative run 36 along the intermediate wall 35 and finally discharge said grain along the straight section 30 and through the outlet opening 28.

Grain, which is elevated by the paddle-type elevator 12, is transferred via an outlet 45 of the flow metering device 21, which will be described in more details hereafter, and a duct or channel 46 to the "bubble-up" auger 13, which is inclined inwardly of the machine and has a discharge end generally above the center of the graintank 7. The "bubble-up" system 13 comprises an inlet basket 41 disposed in receiving relationship to the channel 46 and which itself communicates with a tubular body 42 comprising an auger 43 which is driven in a conventional manner.

An impeller rotor 47 is mounted for rotation between the side walls 26 and below the straight wall section 30 in the proximity of the outlet opening 28 for engagement of the lower portion of the material passing therethrough. The rotor 47 is drivingly connected via a second chain-and-sprocket transmission 48 to the transmission 39 of the paddle conveyor 25. This second transmission 48 is dimensioned as to give to the impeller rotor 47 a circumferential speed which is substantially equal to the speed of the outer edge of the paddles 32 along the upper curved section 29 of the elevator housing 22.

The top of the grain conveyor 11 and the metering device 21 extend into the grain tank 7 as can be seen in FIG. 1. They are shielded from the surrounding grain by a box-like structure 50 which has at it lowest point a small opening to the grain tank 7, such that grain kernels which scattered between the conveyor 11 and the metering device 21 into the structure 50, can evacuate to the grain tank 7 when the latter is emptied.

As shown in FIG. 2, the mass flow metering device 21 basically comprises a pivotally mounted sensor member 51, disposed to be subjected to the centrifugal, gravity and friction forces of the layer of crop material from the conveyor 12, and a sensor 52 operable to sense the displacement of the sensor member 51 as a result of the forces acting thereon.

The sensor member 51 comprises a sheet metal structure which is generally U-shaped in cross-section and which has an inlet portion 54 adjacent the outlet opening 28 of the paddle-type elevator 12 without however making any physical contact with any wall portion thereof. The bottom surface 53 of the U-shape (actually generally the upper wall portion thereof as the U-shape is positioned generally upside-down) has a transverse width which is a little greater than the width of the outlet opening 28. The surface 53 comprises the inlet portion 54, which is generally rectilinear in shape and may be disposed with its upper edge only slightly above the upper edge of the outlet opening 28 and at a small angle not exceeding 10° to the upper straight section 30 of the transverse elevator wall 27. The surface 53 further comprises middle and outlet portions 55, 56, which are circularly curved with a constant radius R about a total angle $\theta_m$ of 90° and have their center at C. The curved middle portion 55 starts at an angle $\delta$ of substantially 55° to the vertical (the grain conveyor 11 in FIG. 2 is not represented in the position which it takes when mounted to the frame 2).

Connected to the inlet, middle and outlet portions 54, 55, 56 of the bottom surface 53 are opposed side walls 57 forming the limbs of the U-shape and extending towards the elevator side walls 26 without making any physical contact therewith.

Two support arms 60 are welded at their upper ends to the side walls 57 and extend parallel to each other in the direction of the conveyor housing 22. The lower portions of the support arms 60 are interconnected by a transverse shaft 61, which is pivotally held in a pair of brackets 62 protruding forwardly from both side walls 26 of the housing 22. The brackets 62 are the front portions of a generally U-shaped mounting frame 63, which fits over the rear wall 27 and the side walls 26 of the housing 22 and is affixed thereto. The brackets 62 constitute a bearing for the pivotment of the sensor member 51 about the pivot axis P, which coincides with the center of the shaft 61.

The support arms 60 extend further below the pivot shaft 61 and are provided at their lower ends with a pair of counterweights 65 which make the center of gravity of the complete sensor member 51, comprising the bottom surface 53, the side walls 57, the arms 60 and the counterweights 65, coincide with the pivot axis P. When the combine harvester 1 is travelling over a field, the sensor member 51 will be subject to all kinds of oscillations due to the movement of the combine frame 2, but because of this particular location of its center of gravity, the sensor member 51 will not react to longitudinal, transverse or upward oscillations.

The pivot shaft 61 is welded to the support arms 60 and holds the lower portion of an upright leaf spring 66. The upper portion thereof is held by a U-shaped bracket 67, which is adjustably mounted to the conveyor housing 22. The horizontal slots in the arms of the bracket 67 enable the repositioning of the leaf spring 66 for the adjustment of the zero load position of the sensor member 51.

The displacement sensor 52 is installed on top of the upper straight section 30 of the transverse wall 27 and faces an angle iron 69 attached to the inlet portion 54 of the sensor member 51. This sensor may be an inductive, capacitive, Hall-effect or ultrasonic sensor or any other kind of sensor which generates a signal proportional to its distance to a facing object. Alternatively the sensor 52 may be attached to a lower portion of the elevator housing 22 and capture the movement of one of the support arms 60.

Figure 5:
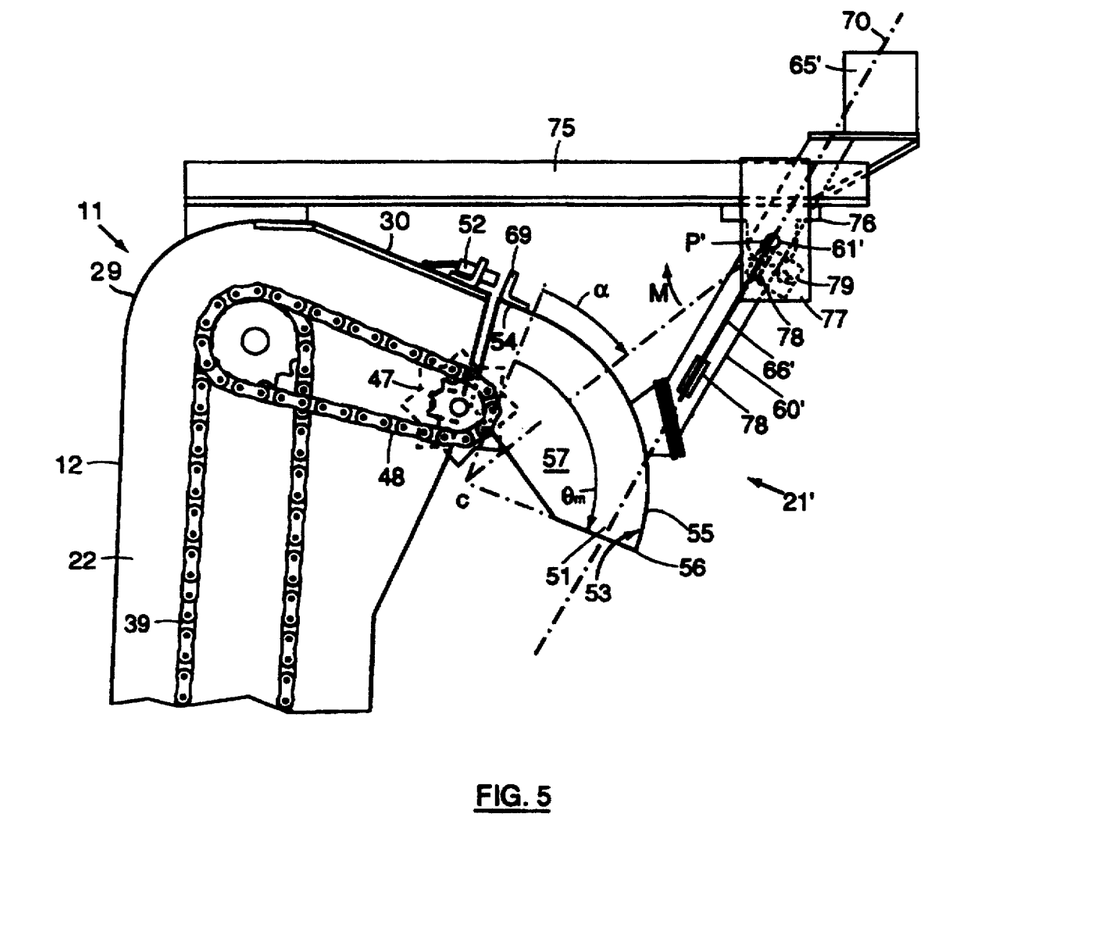
FIG. 5 shows an alternative embodiment of the metering device of FIG. 2.

Another configuration of a sensor member 21' according to the invention is illustrated in FIG. 5. The mass flow metering device 21' comprises a similar sensor member 51' with an identical bottom surface 53 and identical side walls 57. Its middle portion 55 is attached to a forwardly and upwardly extending support arm 60' which is pivotally mounted by a transverse shaft 61' to a bearing 76, which is immovably fastened to a forwardly extending support beam 75. The latter is bolted or welded to the top portion of the conveyor housing 22. The center of the shaft 61' constitutes a pivot axis P' for the sensor member 51'. A counterweight 65' is attached to the upper end of the support arm 60' opposite the surface 53 for placing the center of gravity of the complete sensor member 51' at the pivot axis P'.

A leaf spring 66' is affixed by a pair of clamps 78 to the lower portion of the support arm 60' and is extending therealong in the direction of the pivot axis P'. The upper portion of the leaf spring 66' is affixed by another pair of clamps 78 to a clamp holder 79, which is bolted to a bracket 77 attached to the upper support beam 75. A slot in the holder 79 permits relative movement of the second pair of clamps 78 to the bracket 77 for adjustment of the zero load position of the sensor member 51'.

The sensor 52 may be mounted on top of the elevator housing 22 in order to capture the movement of inlet portion 54 of the sensor member 51', or may be positioned behind or in front of the support arm 60' in order to capture the movement of the latter.

During harvesting operation, the curved elevator paddles 32 are operable, as is conventional, to convey successive packages of clean grain along the intermediate wall 35. The bent profile of the paddles 32 keeps a major portion of each grain package away from this wall 35 such that its mass center lies closer to the middle of each paddle 32 than in the prior art conveyors with straight paddles. As this grain is conveyed around the upper sprocket 23, it is moved radially outwardly under influence of centrifugal forces imparted thereto by the paddles 32, which at that point in the elevator 12, pivot around the shaft of the upper sprocket 23. Thereby the successive quantities of grain carried by the successive paddles 32 are urged towards the upper curved section 29 of the transverse elevator wall 27 to form there a layer of grain kernels.

During the pivotment of a paddle 32, the grain kernels resting thereon move along its upper surface toward its outer edge. However, the kernels which initially occupied the area close to the intermediate wall 35 are subject to smaller centrifugal forces than the kernels closer to the outer edge of the paddles 32. Hence their movement is retarded and not all of them may reach the upper curved wall section 29 before the elevator paddles 32 enter the return run 37. These kernels are projected in the direction of the outlet opening 28 at various speeds and various angles such that the resulting grain flow is not fully coherent. It therefore is of importance to limit the quantity of crop material which is accumulated near the intermediate wall 35 in the operative run 36 of the conveyor 12 and shift a portion thereof towards the outer transverse wall 27 as can be done by the use of curved paddles 32.

The layer of crop material at the inside of the curved wall section 29 is projected to and along the straight wall section 30, which has an inclination angle γ in the range of 20° to the outlet direction of the curved section 29 to hereby concentrate this layer even further and to receive therein most of the grain kernels which were projected at a small deviation angle because they could not reach the tip of the paddle 32 before the latter entered the return run 37. The velocity of the crop material along the straight section 30 is influenced not only by the impact of these 'diverging' kernels, but also by the friction forces between the surface of the section 30 and the mass flow, such that the resulting velocity $v_o$ at the outlet opening 28 will be dependent on the friction coefficient μ of these materials. A higher friction coefficient μ will result in a slower inlet velocity $v_o$ for the sensor member 51 and thicker material layer, a lower friction coefficient μ will result in a higher inlet velocity $v_o$ and a thinner material layer for the same mass flow rate and a constant conveyor speed.

At low conveyor speed or at high mass flow rate, the portion of the material flow which is projected in a lower direction and does not reach the layer along the straight section 30 before the outlet opening 28 may not be negligible. However this portion is engaged by the impeller rotor 47 and is thrown upwardly and forwardly into the material layer thereabove at a velocity which is substantially equal to the velocity of the outer edges of the paddles 32 during their pivotment around the shaft of the upper sprocket 23. Thus is obtained a substantially coherent flow through the outlet 28 of the conveyor 12.

This layer is forcefully ejected in a direction generally tangential to the straight wall section 30 whereby it is caused to engage the sensor member 51 immediately behind the inlet portion 54 thereof and whereafter it is deflected inwardly by the middle and outlet portions 55, 56 and guided further therealong through a curved path until it reaches the inlet of the channel 46 to the "bubble-up" system 13.

The layer of grain kernels thus deflected and guided along the sensor member 51 exerts a local force dF on each angular section dθ of its curved surface 53. This local force is a combination of the local centrifugal, gravity and friction forces and is closely related to the local velocity of the grain kernels along the surface 53 and the side walls 57, as on the one hand the local velocity determines the local thickness of the layer for a constant mass rate and hence the grain mass acting on the angular section dθ and on the other hand, the local velocity determines the values of the local friction force, which is proportional to the velocity itself, and of the local centrifugal force, which is proportional to its square. This local velocity in turn varies along the curved surface in relation to the tangential component of the local force component. It is thus clear that the total force of the material flow on the sensor member 51 is not distributed evenly over its full surface, but that it varies substantially between the start of the contact (at angle δ to the vertical and θ=0) and the outlet of the surface 53 (at θ=θ$_m$). The resulting total force and its distribution are equally influenced by changes to the friction coefficient μ between the material and the surface 53. A high friction coefficient μ will result in high initial friction forces and a quickly diminishing flow velocity, such that the resulting centrifugal and friction forces will be substantially smaller in the last portion of the sensor member 51. A low friction coefficient μ will not dramatically restrain the material flow, which may even accelerate as a result of gravity forces on the layer, such that the resulting centrifugal and friction forces are greater in the last portion of the sensor member 51.

In the metering devices 21, 21' the movement of the sensor members 51, 51' is not the direct result of the local forces dF as such, but of their moments dM about the pivot axes P, P', i.e. the product of the load arm between the pivots and the surface section by the component of the local force dF perpendicular to this load arm. The total moment M follows from the integration of this local moment over the full bottom surface 53. As the local forces dF are dependent on the friction coefficient μ, one may readily assume that the resulting total moment will equally be dependent on this coefficient μ.

The evolution of the flow velocity and the local forces dF may be calculated from the equation of motion of the material along the curved surface. There is no proper analytical solution to this complex equation, which will not be described here further, but the flow and force evolution may be obtained by numerical methods, i.e. by calculation of the various parameters at a surface angle θ and substitution of these values in the equation for a next, slightly greater angle θ+dθ.

The position of the pivot axis P may be defined relative to the center C of the sensor surface 53 in polar coordinates ($R_i$, α), wherein $R_i$ is the ratio of the pivot distance to the surface radius R and α is the angle to the entry of the curved middle portion 55 (θ=0). The resulting moments M about the pivot axis P may be calculated from the force evolution for various values of inlet angle δ, surface angle $\theta_m$, pivot position ($R_i$, α), inlet velocity $v_o$ and friction coefficient μ.

It has been established that an array of pivot points can be found which have the specific property that the total moment M about one of these points is substantially insensitive to changes of the friction coefficient μ, i.e. when the mass rate of the conveyor is kept constant, the changes of the coefficient μ and the consequent changes to the flow pattern along the sensor surface 53, have no substantial effect on the value of the total moment M as sensed at the pivot P. Consequently a mass flow metering device 21, 21' which comprises such member 51 will yield a signal which is substantially insensitive to the changes in friction coefficient μ, which result from the changes in crop and harvesting conditions. Such device will not need recalibration as frequently as the prior art devices for obtaining a comparable reliability of the readings.

In the metering devices 21 and 21', illustrated in FIGS. 2 and 4, the inlet velocity $v_o$ of the material flow itself is friction dependent because of the action of the straight section 30 and the side walls 26 on the layer between the paddle conveyor 25 and the outlet opening 28. This friction-dependent velocity $v_o$ is the start velocity in the equation of motion referred to above and can be used for calculating the resulting moment M about various pivot axes P for various friction coefficients μ.

An analysis of the resulting total moment values shows that, for specific values of the distance ratio $R_i$, two optimal angles $\alpha_1$, $\alpha_2$ can be found for establishing a moment M which is only slightly influenced by changes of μ in the range of 0 to 1. These angles are:

| $R_i$ | $\alpha_1$ | $\alpha_2$ |
| --- | --- | --- |
| 1.25 | 47° | 148° |
| 1.50 | 40° | 155° |
| 1.75 | 34° | 160° |
| 2.00 | 30° | 164° |
| 2.25 | 27° | 168° |

These optimal locations for the pivot points are situated on or near the chain line 70 shown in FIGS. 2 and 5. This line 70 crosses the outlet of the sensor member 51 at about ⅘ of the surface radius R and has an angle of 7° to the tangent to the outlet portion 56. This is the array of optimal pivot points about which a total moment M can be measured which is substantially insensitive to changes of the friction coefficient μ.

Figure 6:
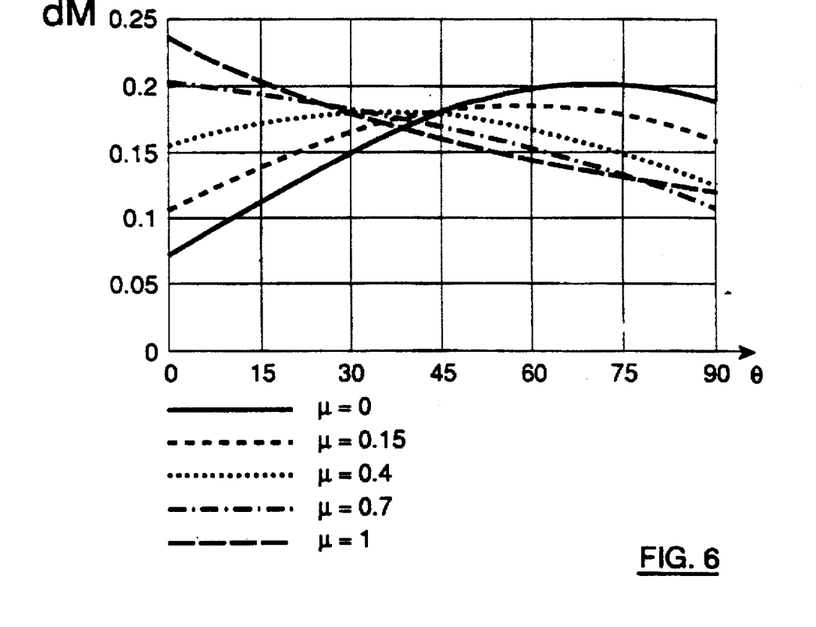
FIG. 6 is a chart representing the value of the local moment along the deflecting surface of the metering device of FIG. 2 for various friction coefficients.

FIG. 6 is a chart of the moments dM resulting from the local forces dF along the curved surface 53 of FIG. 2 for various values of μ in the range 0 to 1. The moments are established with respect to the optimal pivot point P. A high friction coefficient μ generates a high initial moment value dM, which decreases quickly along the sensor surface. A low friction coefficient μ generates a low initial moment value dM which increases to reach a maximum in the second half of the sensor surface. It will be appreciated that the graphs for different values of μ intersect in an area close to the bisector of the curved portions 55, 56 and that the surface under these graphs is substantially equal for all values of μ. This confirms the low sensitivity to friction variations of this configuration. Similar charts can be drawn for other pivot points along the same line 70 of FIG. 2. However it is understood that the total value of the moment M will be relatively small in the immediate vicinity of the surface 53, such that it is advised to choose a pivot point which lies further away from this sensor member 51.

Figure 7:
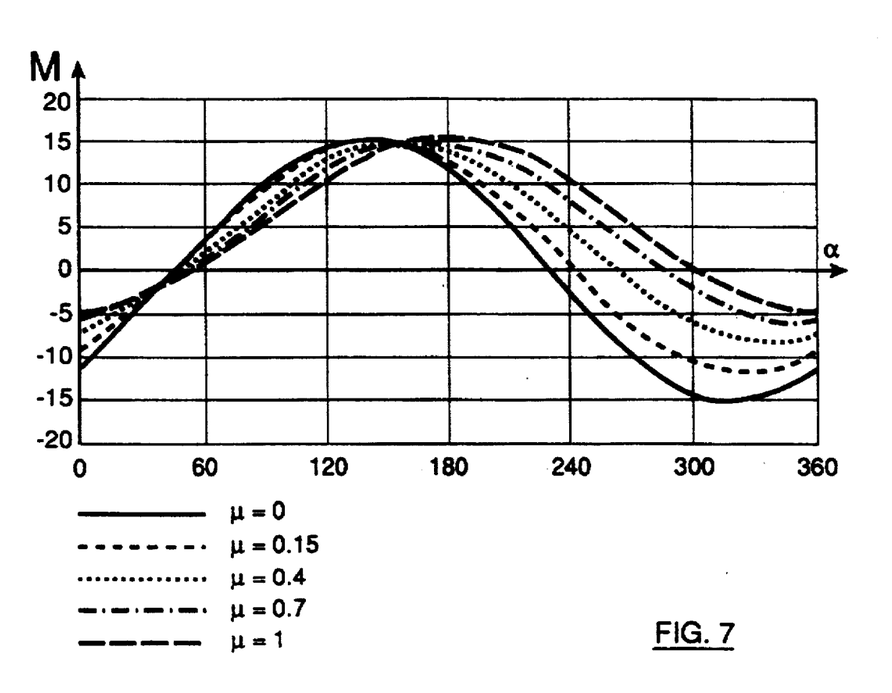
FIG. 7 is a chart representing the value of the total moment on the deflecting surface for various locations of the pivot axis and for various friction coefficients.

It is feasible to choose a predetermined distance ratio $R_i$ and to calculate the total moment M of the forces on a curved surface 53 for various angles α and various friction coefficients μ. The results from such calculation for the surface configurations of FIGS. 2 and 5 is shown in FIG. 7. The distance ratio has been set to $R_i$=1.5. The moment graphs for the various values of μ intersect in two areas, one in the first quadrant and the other in the second. The first intersection point lies at α=40° and the second at α=155°, which confirms the figures in the table above. However the total value M is much smaller at the first intersection point, such that it is preferable to select the intersection point in the second quadrant. Hence the preferred pivot point P is situated downstream the sensor surface 53 as in FIG. 2. The upper pivot point P' of FIG. 5 equally provides friction-independent mass flow measurement, but induces lower moment values M.

The total moment M of the mass flow forces on the sensor member 51 is proportional to the mass flow rate of the grain. This moment M is operable to produce a minimal deflection of the spring 66, 66' thus allowing a minimal angular displacement of said sensor member 51. This minimal displacement, which preferably is no more than e.g. 2 mm, is detected by means of the displacement sensor 52 which, in turn, generates an electrical voltage signal which equally is proportional to the mass of the grain issuing from the elevator 12.

The sensor 52 is coupled to an electronic box, comprising signal processing means for establishing the mass flow rate in accordance with the input from the sensor signal. These data may be accumulated to establish the total grain mass which has been collected in the grain tank over an area or time span. The product of the active width of the header by the actual ground speed of the combine harvester 1 is the area harvested per time unit. The division of the mass flow rate by this product results in the actual crop yield per area unit. This value in combination with the actual position of the harvester 1 can be used to establish a yield map for the whole field. Conventionally the signal processing means comprise a micro-processor means, which are operable to read, process and store numeric data, command switches and display means for communicating a read-out to the operator.

In the examples described above the flow velocity at the entrance of the curved portions was dependent on the friction coefficient μ, because of the flow of the material along the straight wall section 30 of the elevator housing 22. In cases where no such wall section is present or where its friction effect may be neglected, there will be a constant inlet velocity $v_o$ at the beginning of the curved surface 55, 56. The evolution of the flow velocity and the local forces dF may equally be calculated from the equation of motion of the material mentioned above for establishing the resulting moment M about a pivot point defined by its polar coordinates ($R_i$,α). As explained above an array of optimal pivot points can be found where the influence on the total moment M from changes to the friction coefficient μ is only marginal.

Figure 8:
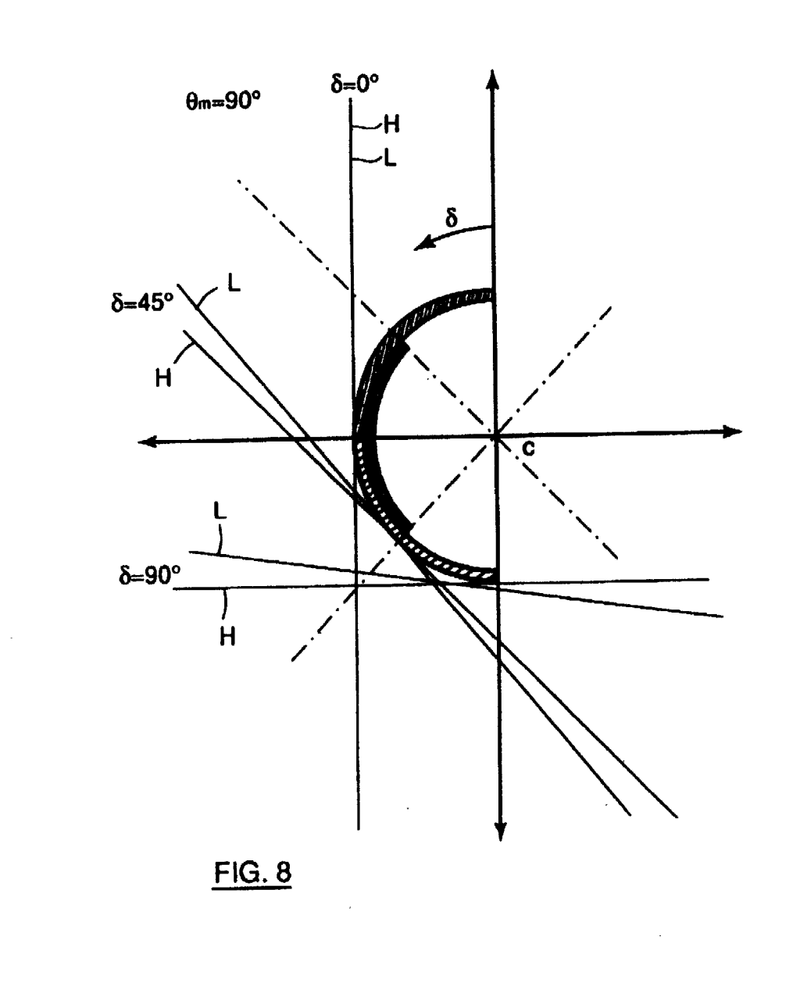
FIG. 8 is a schematic representation of the optimal locations for the pivot axis for various positions of the deflecting surface.

These arrays have been illustrated in FIG. 8 for various inlet angles δ and for high (H) and low (L) inlet velocities $v_o$, the high inlet velocity corresponding to the unpractical values of 40 m/s and higher and the low inlet velocity corresponding to the more conventional value of 5 m/s.

The curved surfaces extend over total angle $\theta_m$ of 90°. It is to be understood that their representation in this Figure is only schematic. For an inlet angle δ=0° and both high and low inlet velocities, the array takes the form of a vertical line which is tangent to the outlet portion of the curved surface.

For an inlet angle δ=90° and high inlet velocity, the optimal array forms a horizontal line, which equally is tangent to the outlet portion of the curved surface. For low inlet velocity, this array is a line which intersects said tangent in the proximity of the outlet portion and has an angle of substantially 7° thereto. For lower inlet velocities this line rotates even further in the direction of the vertical. This is the configuration of a gravitational chute which may be installed below the outlet of a vertical container or silo.

For an inlet angle δ=45°, a high inlet velocity will result in an array in the form of the tangent to the outlet portion. At low inlet velocity this line is pivoted about substantially 5° in the direction of the vertical.

More generally, an advantageous location for a pivot point P of sensor member with a curved flow surface is located in one of the sectors defined by a top on or adjacent said outlet portion, a first line parallel to the tangent to the outlet portion (for very high inlet velocities) and a second line obtained by the rotation of said first line over 15° line in the direction of the vertical (for very low inlet velocities).

Figure 9:
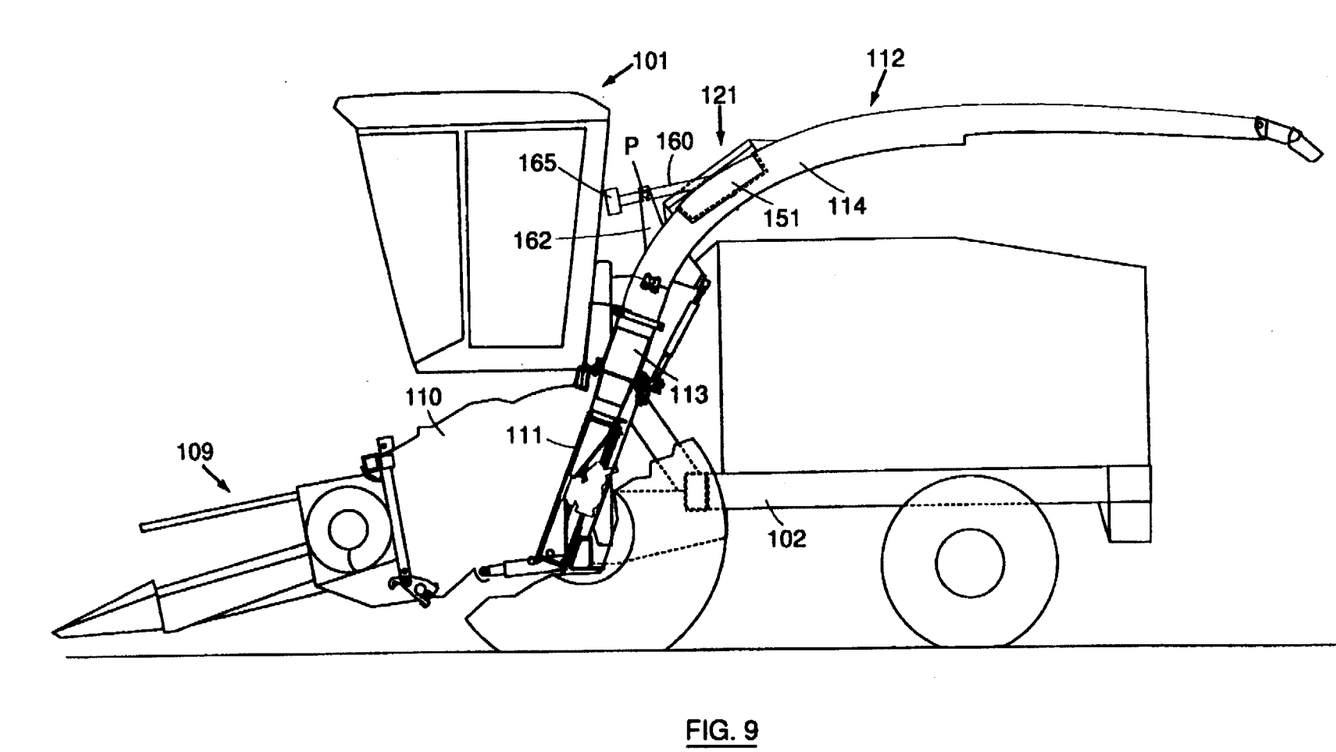
FIG. 9 is a side elevational view of a forage harvester, embodying a flow rate meter according to the invention.

FIG. 9 shows a further application of a mass flow metering device according to the invention. A forage harvester 101 comprises a main frame 102 to which are mounted ground engaging traction wheels and steering wheels. The forage harvester is shown equipped with a row crop attachment 109, suitable for the harvesting of corn, but which can be replaced with another type of attachment, depending on the type of crop to be harvested. The row crop attachment delivers the crop material to crop comminuting means installed in a front unit 110 of the forage harvester. The processed crop material is delivered to a blower rotor 111 which is installed within a blower housing, attached to the main frame 102. The blower rotor 111 throws said material upwardly into a discharge means 112, comprising a straight tube 113 and a curved discharge spout 114, which can be positioned by an operator to direct the cut crop material as required, normally into a wagon which is moving alongside or behind the forage harvester.

For similar purposes as in grain harvesting, the operator may want to asses the actual mass flow rate of the forage crop during normal harvesting operations. To this end a flow metering device 121 is installed on the spout 114. A substantially rectangular opening is provided in the curved upper portion of the spout 114. This opening is covered by a curved sensor member 151 with a generally U-shaped cross section. A support arm 160 is attached to the middle portion of the sensor member 151 and is mounted for pivotment to a pair of upright arms 162 extending from the lower portion of the spout 114. The inlet portion of this sensor member 151 is installed over the front edge of the spout opening and its outlet portion extends into the rear portion of the spout in order to ensure unhampered flow of the forage crop from the spout inlet to the spout outlet.

A counterweight 165 provided at the front end of the support arm 160, brings the center of gravity of the sensor member assembly to its pivot axis P. A spring assembly (not shown) defines the zero load position of the sensor member 151 and its displacement under the action of the crop flow therealong is sensed by a displacement sensor (equally not shown).

This sensor member 151 is subject to the same centrifugal, friction and gravity forces from the crop material as the sensor member 51 described above. For this configuration also an array of optimal locations can be found for the pivot axis, about which a moment can be measured which is substantially independent of the friction factor μ between the crop material and the metal of the sensor member 151. In this case also this array takes the form of a line in the vicinity of the tangent to the outlet portion of the curved member 151.

In the mass flow metering devices described above, friction influences have been minimized by measuring a moment M about a properly set pivot point. A further analysis of the local forces dF on a curved sensor member reveals that the total force F resulting therefrom equally comprises a component $F_α$ which is only slightly subject to changes to the friction coefficient μ between the bulk material and the sensor surface.

The angle α as seen from the center C of a circular sensor surface is defined with respect to the entry inlet of the circular section (θ=0). $F_α$ is the component of the total force F in the direction of α.

In the metering device described in EP-A-0.208.025, the sensor member was mounted for substantially linear displacement in the direction of the bisector of the sensor surface against the force of set of leaf springs. This displacement is proportional to the force in the direction of the bisector and hence of the mass flow rate, but is not independent of variations of the friction coefficient.

Figure 10:
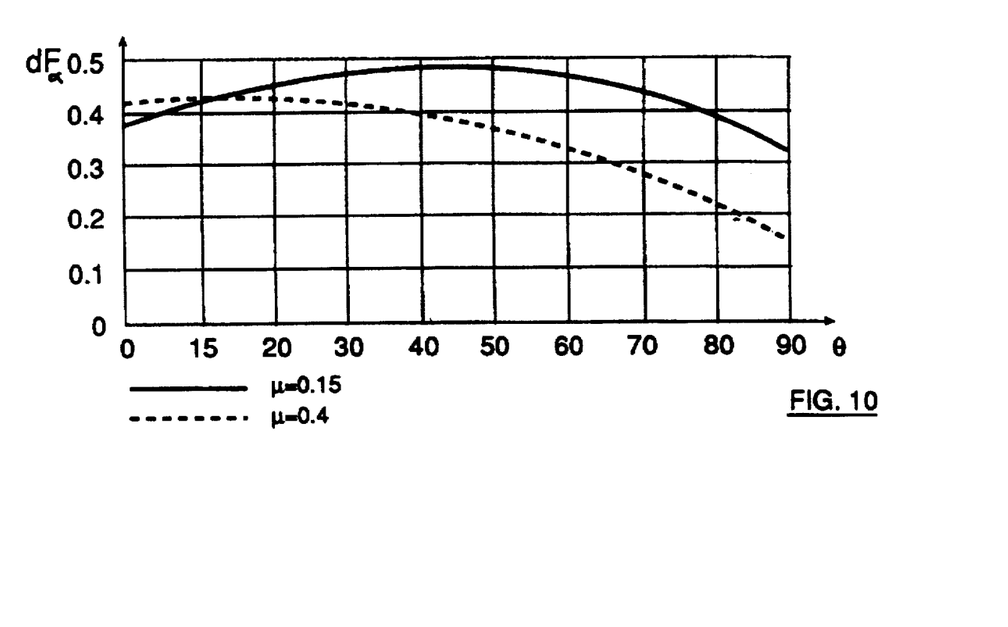
FIG. 10 is a chart representing the value of the force component in the direction of the bisector along the surface of the deflecting surface of FIG. 2 for various friction coefficients.

FIG. 10 shows the evolution of the local force component $dF_α$ in the direction of the bisector α for a high and low friction coefficient μ. The sensor surface extends over $θ_m$=90° and the force component extends in the direction α=45°. The graphs for high and low friction coefficients μ do not intersect in the middle of the surface but about the angle θ=17°. The total force component $F_α$ which is equal to the surface below the graph of the local force component $dF_α$, is significantly greater in the case of a low μ value than in the case of a high μ value. Hence, the direction of the bisector is not a appropriate force measurement direction for the compensation of friction coefficient variations.

Figure 11:
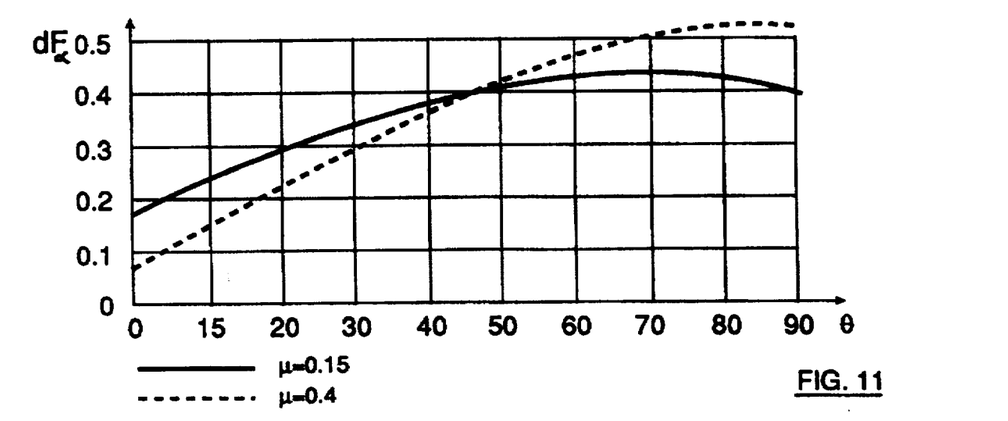
FIG. 11 is a chart representing the value of the force component in a direction perpendicular to the direction of the outlet of the surface of FIG. 2 for various friction coefficients.

For elimination of these friction effects, a direction α has to be established for which the graphs for various μ values intersect at about the middle of the sensor surface. FIG. 11 shows the graphs of the local force component $dF_α$ in the direction perpendicular to the tangent to the outlet portion of the surface (α=90°). The graphs for μ=0.15 and μ=0.40 intersect at about the bisector of the sensor surface and the surfaces below are substantially equal. Hence a force measurement in this direction of the outlet proves to be substantially insensitive to the effects of friction coefficient variations.

Figure 12:
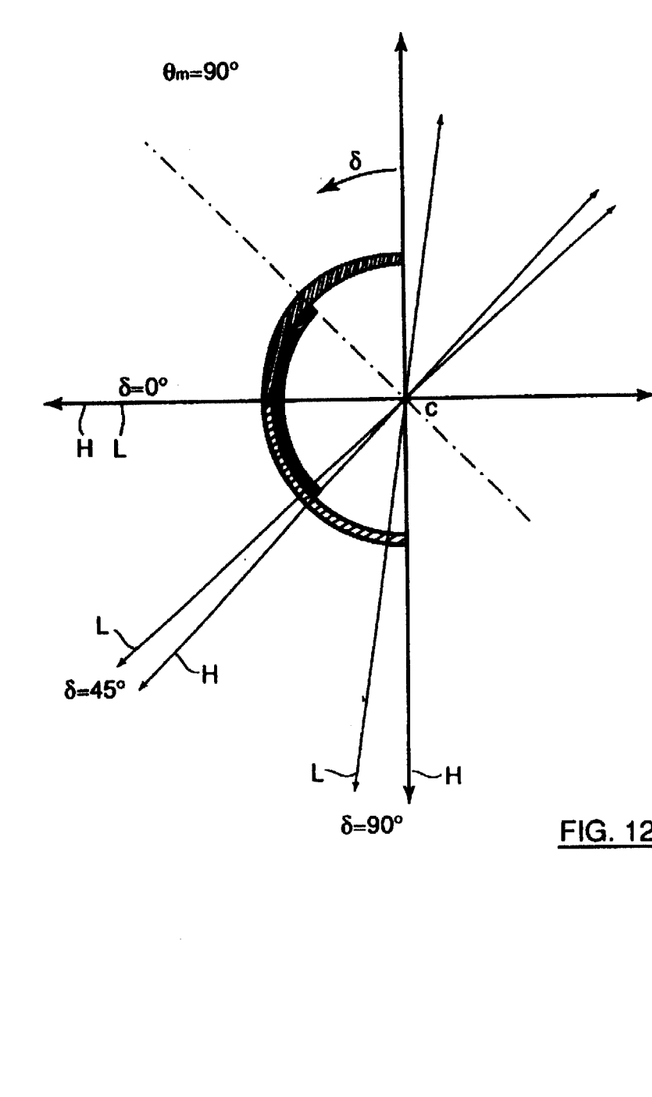
FIG. 12 is a schematic representation of the optimal direction of the force component for various positions of the deflecting surface.

FIG. 12 illustrates the optimal force measurement directions for various positions of a circular sensor surface extending over $θ_m$=90° and for various friction-independent inlet velocities. The optimal directions are shown for inlet angles δ equal to 0°, 45° and 90° and for a high inlet velocity (H) of more than 40 m/s and a low inlet velocity (L) of 5 m/s.

For an inlet angle δ=0° and both high and low inlet velocities, the optimal direction is horizontal, i.e. perpendicular to the flow direction at the surface outlet or to the tangent to the outlet portion of the curved surface.

For an inlet angle δ=90° and a high inlet velocity, the optimal measurement direction is vertical, which is equally perpendicular to the outlet portion of the curved surface. For low inlet velocity, this direction shifts about an angle of 7° towards the horizontal. For lower inlet velocities this line rotates even further in the same sense. The surface is disposed as in a gravitational chute.

For an inlet angle δ=45°, a high inlet velocity engenders an optimal measurement direction which is perpendicular to the tangent of the outlet portion. At low inlet velocity this line is pivoted about substantially 5° towards the horizontal.

More generally, an advantageous direction for measurement of a force component on a sensor member with a curved flow surface is in the range between a first direction perpendicular to the tangent to the outlet portion and a second direction obtained by the rotation of said first direction over 15° towards the horizontal.

Figure 13:
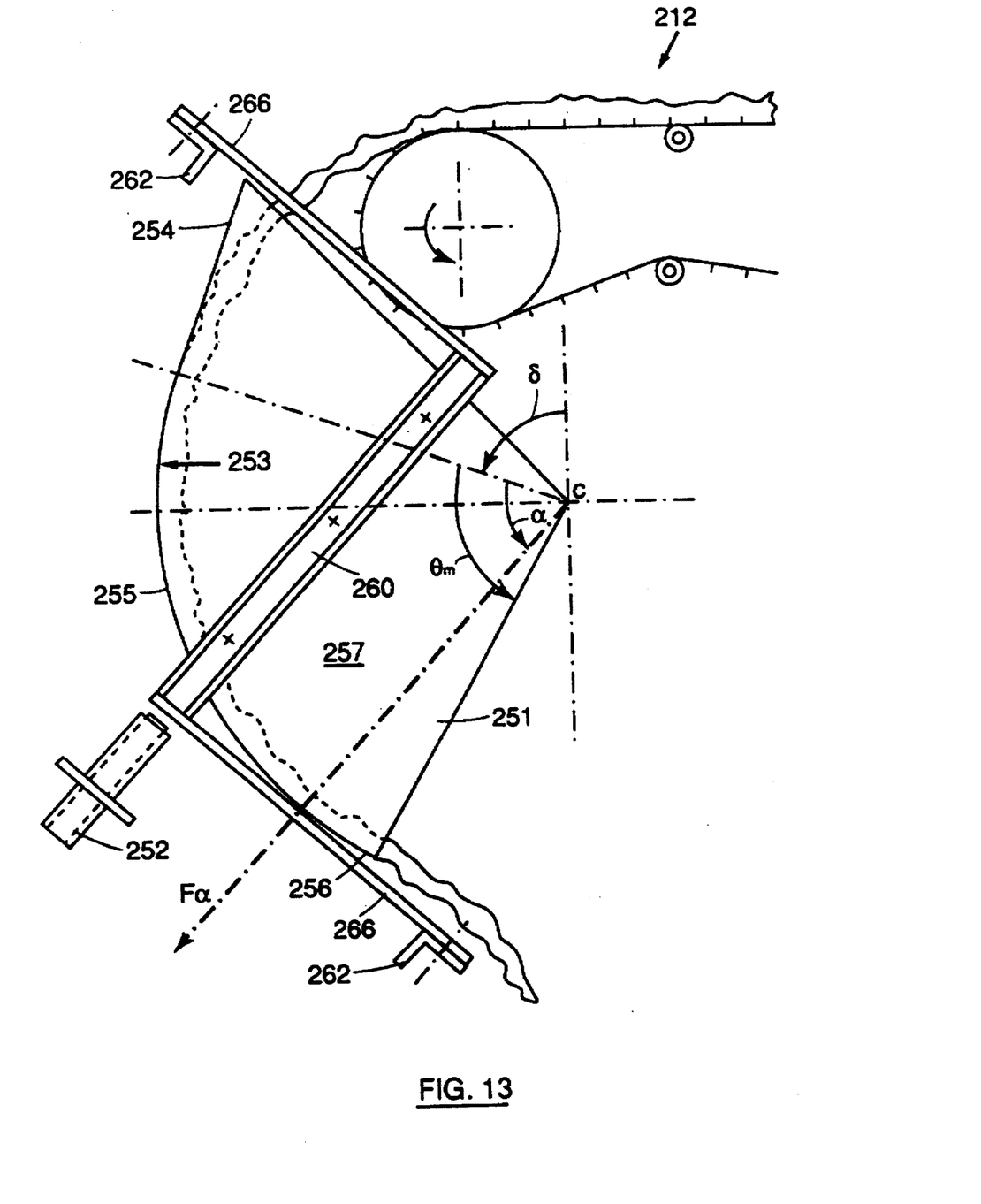
FIG. 13 shows a further embodiment of the present invention in combination with a belt conveyor.

A flow metering device employing the measurement of a friction-independent force component is shown in FIG. 13. The metering device comprises a conventional belt conveyor 212 operable to convey bulk material at a constant belt velocity of 1 m/s to a sensor member 251 in the form of generally U-shaped chute, which is in many respects similar to the sensor member 51 of FIGS. 2 and 5. The sensor member 251 comprises a pair of parallel side walls 257 and a transverse sensor surface 253 inbetween, constituted by a generally rectilinear inlet portion 254 and circularly curved middle and outlet portions 255, 256, which together extend over an angle $\theta_m=80°$. This angle is smaller than in the previous cases in order to avoid excessive deceleration of the material near the outlet portion 255 and consequent plugging of the sensor member 251.

The bulk material is projected by the belt conveyor into the sensor member 251, which is positioned for obtaining a coherent material layer at the inlet angle $\delta$, near the transition of the inlet portion 254 to the middle portion 255. The rectilinear portion 254 is disposed tangentially to the material flow in order to avoid material scattering away from the sensor surface 253.

A straight support arm 260 is mounted onto the each side wall 257 at an angle $\alpha=67°$ to the radius extending to upper end of the curved middle portion 255. The upper and lower ends of the arms 260 extend beyond the sensor member 251 and are attached to perpendicularly mounted leaf springs 266 of equal length, which are attached to angle irons 262 of a stationary frame (not shown). The action of the material flow on the sensor surface 253 effects a displacement of the sensor member 251 in the direction of the support arms 260. This displacement is proportional to the force component $F_\alpha$ which in turn is proportional to the mass flow rate. The displacement is captured by a distance sensor 252 which is coupled to electronic circuitry, comprising a microprocessor for the assessment of the actual mass flow rate.

This device measures the force component $F_\alpha$ in a direction which has angle of 13° to the direction which is perpendicular to the tangent to the outlet. This force component is particularly insensitive to the effects of friction coefficient changes in the range of $\mu=0$ to $\mu=0.7$.

Although the present invention has been described with respect to a circularly curved and resiliently mounted sensor surfaces, other embodiments can be thought of without departing however from the original idea of the invention.

For example, one may consider to use a sensor member with a curved middle portion and a straight outlet portion and measure the force component of the material flow in a direction substantially perpendicular to the outlet direction. It is also conceivable to measure the moment of the sensor member about an axis which is chosen in the proximity of the line extending along the outlet portion.

The metering device may equally be equipped with transducers or load cells mounted to the sensor member, instead of displacement sensors. These transducers produce a signal proportional to the force thereon in a predetermined direction, and may comprise piezoelectric elements or strain gauges. In such cases it is no longer required to mount the sensor members to resilient means.

A friction-insensitive force component may also be established indirectly by proper combination of the force components in two different directions, which each may be sensed by force sensors disposed at different angles.

A sensor member may also be mounted to the main frame by a rigid torsion axle instead of a combination of a pivot means and a spring means. In this case the axle may be equipped with torque sensing means for establishing the total moment of the forces of the material flow along the sensor surface.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. A mass flow metering device (21) for metering the mass flow rate of a flow of bulk material, said metering device comprising:

feeder means (12; 212) for providing a flow of bulk material and inducing an outlet speed thereto in a predetermined direction at an outlet (28) of said feeder means (12);

a sensor member (51; 251), comprising a flow deflecting surface (53; 253) having:
an inlet portion (54; 254) disposed in flow receiving relationship behind said outlet (28) of said feeder means (12) and oriented in an inlet direction substantially parallel to said predetermined direction of material flow at the outlet (28) of said feeder means (12);
a concave middle portion (55; 255) along which said material flow is guided in a generally arcuate path; and
an outlet portion (56) for discharging said material flow in an outlet direction different from said inlet direction;

said sensing means being mounted such that the flow deflecting surface (53; 253) is subject to a force (F) and a moment (M) resulting from the combination of the centrifugal, gravity and friction forces from said material flow;

said metering device (21) further comprising:
means (52; 252) for sensing a component ($F_\alpha$) of the resulting force (F) on said surface (53) in a predetermined direction ($\alpha$) or a resulting moment (M) of said force about a predetermined point (P) and generating a signal proportional to said force or moment (M); and
signal processing means coupled to said sensing means for generating an indication of the mass rate of said material flow;

said metering device (21) being characterized in that:
said sensing means sense a force component ($F_\alpha$) or a moment (M) which remains substantially constant when the mass rate is kept constant and the material flow at said outlet (28) of said feeder means (12; 212) and/or along said crop deflecting surface (53; 253) varies as a result of variations of the friction coefficient ($\mu$) between the bulk material and the surface of the feeder means (12; 212) and said crop deflecting surface (53; 53).

2. A mass flow metering device according to claim 1, wherein
said sensor member (51) is mounted for pivotment about a pivot axis (P) and said sensing means (52) sense the moment (M) of the forces on said flow deflecting surface (53) about said pivot axis (P).

3. A mass flow metering device according to claim 2, wherein
said pivot axis (P) is disposed on a line (70) extending in the proximity of said outlet portion (56) and generally parallel to said outlet direction.

4. A mass flow metering device according to claim 3, wherein
said sensor member (51) has a generally circularly curved middle portion (55) and outlet portion (56) and said pivot axis (P) is disposed in one of the sectors defined by a point on or adjacent said outlet portion (56), a first line (H) parallel to the tangent to the outlet portion (56) and a second line (L) obtained by the rotation of said first line over 15°.

5. A mass flow metering device according to claim 4, wherein
said inlet portion (54) is generally straight, said middle portion (55) and said outlet portion (56) together extend over substantially 90° and said pivot axis (P) is disposed on a line which intersects the surface radius in the direction of the outlet portion (56) at about ⅓ of said radius and has an angle of substantially 7° to the tangent to the outlet portion (56).

6. A mass flow metering device according to claim 2, wherein said pivot axis (P) is disposed downstream of said outlet portion (56).

7. A mass flow metering device according to claim 2, wherein the center of gravity of said sensor member (51) is disposed on said pivot axis (P).

8. A mass flow metering device according to claim 7, wherein
said sensor member (51) comprises lever means (60, 65) comprising at least one pivot arm (60) mounted for pivotment about said pivot axis (P) and carrying at the one end said flow deflecting surface (53) and at the other end a counterweight (65).

9. A mass flow metering device according to claim 1, wherein
said sensing means (252) sense the component ($F_\alpha$) of said resulting force (F) in a direction ($\alpha$) substantially perpendicular to said outlet direction.

10. A mass flow metering device according to claim 9, wherein
said sensor member (251) has a generally circularly curved middle portion (255) and outlet portion (256) and said sensing means (252) sense the component ($F_\alpha$) of said resulting force (F) in a direction in the range of 75° to 90° to the tangent to said outlet portion (256).

11. A mass flow metering device according to claim 10, wherein
said range of 75° to 90° extends between the horizontal and the direction perpendicular to said tangent.

12. A mass flow metering device according to claim 1, wherein
said feeder means comprise a conveyor means (12) and a stationary guide means (30) disposed between said conveyor means (12) and said outlet (28) of said feeder means and
said stationary guide means comprise a guide plate (30) disposed at an angle of 0° to 10° to said inlet direction.

13. A mass flow metering device according to claim 12, wherein
said conveyor means (12) comprise a paddle conveyor (25) for conveying said bulk material in a main conveying direction (38) and said guide plate (30) is disposed near the paddle conveyor outlet at an angle of angle of 65° to 75° to said main conveying direction (38).

14. A mass flow metering device according to claim 1, wherein
said feeder means (12) comprise impeller means (47) installed at the outlet thereof and operable to direct a portion of said flow of bulk material toward said sensor member (51).

15. A mass flow metering device according to claim 14, wherein
said impeller means comprise a transverse rotor (47) which engages the lower portion of said flow of bulk material.

16. A mass flow metering device according to claim 15, wherein
said feeder means comprises conveyor means (12) for conveying said bulk material at a predetermined conveyor speed and said transverse rotor (47) is rotated at a circumferential speed, which is substantially equal to said predetermined conveyor speed.

17. A mass flow metering device according to claim 1, wherein
said feeder means (12) comprises a paddle conveyor (25) operable to convey bulk material along an inner wall (35) of a conveyor housing (22), said paddle conveyor (25) includes means (32–34) for concentrating conveyed packages of bulk material at the outlet of said paddle conveyor (25).

18. A mass flow metering device according to claim 17, wherein
characterized in that said concentrating means (32–34) comprises paddles (32) having a surface which is at least partially curved.

19. A mass flow metering device according to claim 19, wherein
said paddles (32) have a surface with a straight portion proximate an outer wall (27) of said conveyor housing (22) and a portion which is curved forwardly with respect to the conveying direction (38) adjacent said inner wall (35).

20. A mass flow metering device according to claim 2, wherein
said sensing means (52) comprise a torque sensor, installed at the pivot axis (P) of said sensor member (51).

21. A mass flow metering device according to claim 1, wherein
said metering device is installed on a forage harvester (101) for measurement of an actual flow of crop material and said flow of crop material is the flow of comminuted crop material through a spout (114).

* * * * *